Patented Mar. 14, 1944

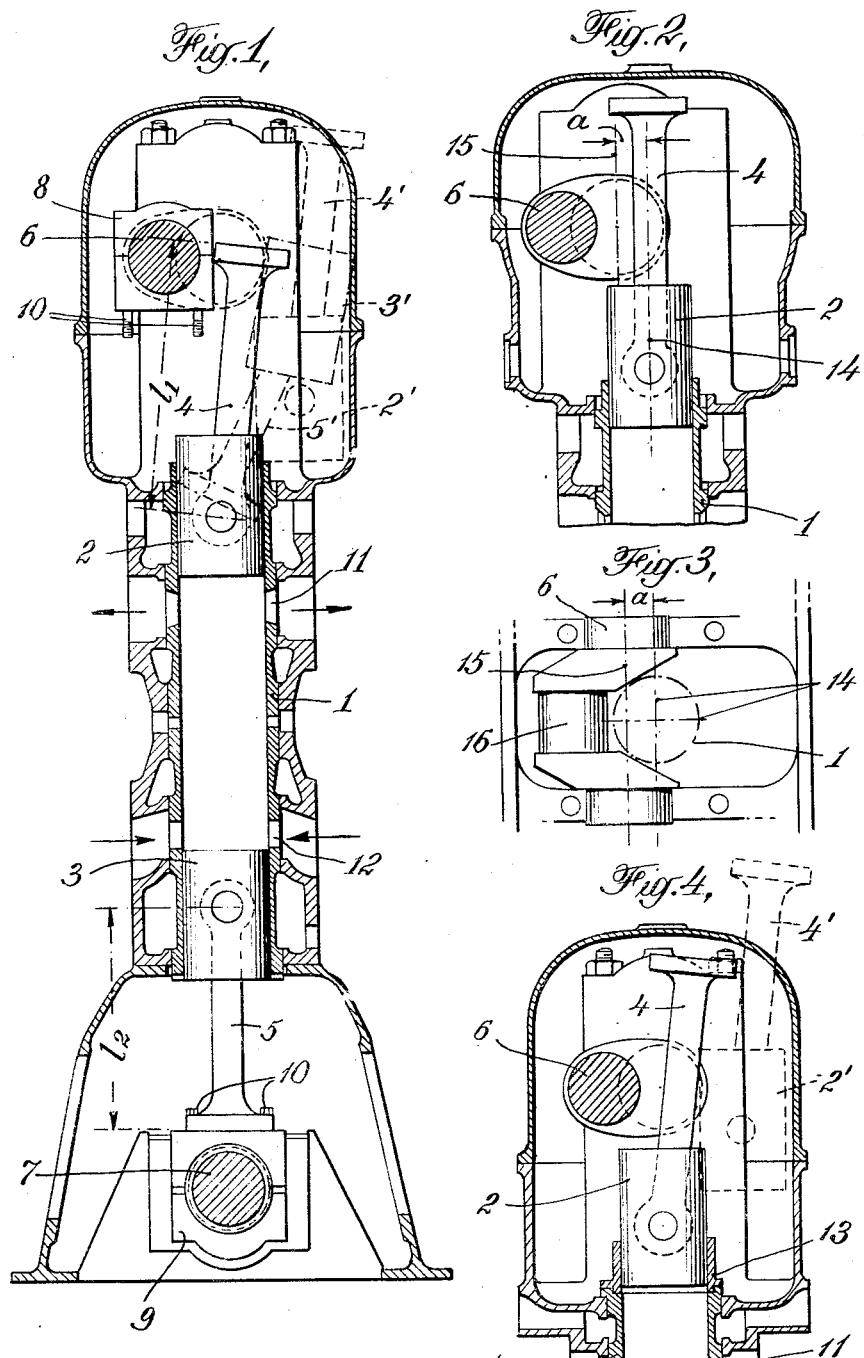

2,344,224

UNITED STATES PATENT OFFICE 2,344,224

PORT-CONTROLLED OPPOSED-PISTON INTERNAL COMBUSTION ENGINE

Erwin Waeber, Winterthur, Switzerland, assignor to Sulzer Frères, Société Anonyme, Winterthur, Switzerland Application November 12, 1941, Serial No. 418,704
In Switzerland January 8, 1941

2 Claims. (Cl. 123—51)

The invention relates to a port-controlled opposed-piston internal combustion engine in which the opposed pistons are equal in diameter and make practically equal strokes. The invention consists in the connecting rod of one piston being longer than the connecting rod of the other piston, in order to have sufficient space available between the cylinder and the running gear of the piston fitted with the longer connecting rod, so that both pistons with their connecting rods can be dismantled at one end of the cylinder without removing the running gear.

Opposed-piston internal combustion engines—particularly highly supercharged opposed-piston internal combustion engines—have hitherto had the drawback that the pistons could be dismantled only after the running gear at least at one end of the cylinder had been removed. Even if only one piston had to be dismantled in a multi-cylinder engine, not only had all crankshaft bearings to be dismantled, but also all connecting-rod bearings had to be opened up and the crankshaft taken out. Only then was it possible to withdraw the piston. Through the present invention the time required for dismantling the piston is considerably shortened.

In order also to reduce the pressure exerted on the running surface of the cylinder by the piston controlling the outlet ports and to be able to lengthen the duration of the inflow of air, it is preferable to make the connecting-rod of the piston that controls the outlet ports longer than the connecting rod of the piston that controls the inlet ports.

The short time required for dismantling thus obtained by the invention may be shortened even more, if the dismantling is still further facilitated either by displacing the axis of the crankshaft with respect to the axis of the cylinder, or by arranging, at the dismantling end of the cylinder, a bush which can be removed along with the piston.

Some examples of the subject matter of the invention are shown in a simplified manner on the drawing.

Fig. 1 shows an internal combustion engine according to the invention.

Fig. 2 is a cross-section and

Fig. 3 is a plan showing the displacement of the cylinder axis with respect to the shaft axis.

Fig. 4 shows the arrangement of a bush which can be removed with the piston.

In the cylinder 1 are arranged two opposed-pistons 2 and 3 which work respectively through connecting rods 4 and 5 on crankshafts 6 and 7. The length $l_1$ of the connecting rod 4 of the piston 2 is greater than the length $l_2$ of the connecting rod 5 of the other piston. In this way so much space is provided between cylinder 1 and crankshaft 6 of the piston 2 fitted with the longer connecting rod 4 that both pistons 2 and 3 can be dismantled without removing the crankshaft 6.

Each of the two connecting rods 4 and 5 has a big-end 8 and 9 respectively, fixed to the connecting rods 4 and 5 respectively, by means of the bolts 10. After removing the bolts 10 and, if necessary, removing the big-end 8, connecting rod 4 and piston 2 can be brought into the positions 2' and 4' respectively as shown in broken lines in Fig. 1, and then pulled out upwards. The connecting rod 5 can then be disconnected from the big-end 9, raised together with the piston 3 through the cylinder 1 into the positions 3' and 5' respectively shown in chain-dotted lines in Fig. 1, and then withdrawn upwards.

The pistons are preferably dismantled at the end of the cylinder where the outlet ports 11 are situated. In consequence of the long connecting rod at the dismantling end, the pressure of the outlet piston 2 on the cylinder running surface—a pressure increased by the necessary advance of the outlet crankshaft 6 with respect to the inlet crankshaft 7—will be again diminished. In addition to that, also the duration of the inflow of air through the inlet ports 12 will be lengthened, since the connecting rod 5 of the inlet piston 3 is short and the piston speed in the neighbourhood of the inlet dead centre is consequently more reduced.

The dismantling will be further simplified if, as shown in Figs. 2 and 3, the axis 14 of the cylinder 1 and the axis 15 of the crankshaft 6 are displaced with respect to each other by the amount $a$. In this way it becomes possible for the pistons and the connecting rods to be pulled up and withdrawn from the engine practically vertically between the crank-webs, as indicated in Fig. 3. Thereby also the pressure on the cylinder running surface by the piston 2 controlling the outlet ports 11 will be further diminished.

According to Fig. 4 the cylinder 1 has at the dismantling end also a bushing 13 which can be removed with the piston, thus also facilitating the dismantling of the piston. The bushing 13 can be withdrawn from the engine together with the piston and can later be removed from the piston.

I claim:

1. In an opposed-piston internal combustion engine having at least one cylinder provided with two counteracting pistons of equal diameter, the improvement which comprises a separate crankshaft for each piston constructed to give each piston practically equal strokes, a connecting rod for each piston, one rod being considerably longer than the other, outlet ports in the cylinder under the control of the piston connected to the longer connecting rod, whereby the pressure on the cylinder running surface near the outlet ports is reduced and the movement of the piston with respect to the outlet ports is slower increasing the duration of air flow, and means for spacing the crankshaft which is connected to the longer connecting rod such a distance from the cylinder that when both connecting rods are disconnected from their crankshafts both pistons and connecting rods may be removed from the cylinder without removing the last-mentioned crankshaft.

2. In an opposed-piston internal combustion engine having at least one upright cylinder provided with two counter-acting pistons of equal diameter, the improvement which comprises a separate crankshaft for each piston with cranks of the same radius to give each piston practically equal strokes, a connecting rod attached to each piston, the connecting rod attached to the upper piston being considerably longer than the other connecting rod, and means for spacing the upper crankshaft which is connected to the longer connecting rod such a distance from the cylinder that when both connecting rods are disconnected from their crankshafts both pistons and their attached connecting rods may be removed from the cylinder towards the upper crankshaft without removing the upper crankshaft.

ERWIN WAEBER.